United States Patent [19]
Huber

[11] 3,870,933
[45] Mar. 11, 1975

[54] SYSTEM FOR CONTROLLING AN ELECTRIC FIELD

[75] Inventor: Kenneth C. Huber, Greensboro, N.C.

[73] Assignee: Burlington Industries, Inc., Greensboro, N.C.

[22] Filed: July 31, 1973

[21] Appl. No.: 384,229

Related U.S. Application Data

[63] Continuation of Ser. No. 123,229, March 11, 1971, abandoned.

[52] U.S. Cl. .................................. 317/262 AE
[51] Int. Cl. ................................ G01r 5/28, H05
[58] Field of Search ..................... 317/4, 262 AE

[56] References Cited
UNITED STATES PATENTS

| | | | |
|---|---|---|---|
| 2,264,495 | 12/1941 | Wilner | 317/4 |
| 2,556,458 | 6/1951 | Webster | 324/32 |
| 3,018,376 | 1/1962 | Vanderschmidt | 250/83.6 FT |
| 3,104,320 | 9/1963 | Speakman | 250/83.6 FT |
| 3,384,747 | 5/1968 | Able | 324/32 |
| 3,387,181 | 6/1968 | Michener et al. | 317/262 AE |
| 3,449,668 | 6/1969 | Blackwell et al. | 324/32 |
| 3,510,766 | 5/1970 | Russell et al. | 324/72.5 |
| 3,546,587 | 12/1970 | Turelek | 324/72 |
| 3,614,606 | 10/1971 | Schmidt | 324/33 |

Primary Examiner—L. T. Hix
Attorney, Agent, or Firm—Cushman, Darby and Cushman

[57] ABSTRACT

An electric field detection and control system for a room includes a detector in which a metallic probe is exposed to the atmosphere of a room and electrically connected to a voltmeter for indicating the electrostatic charge in the room's atmosphere. A radioactive element attached to the probe causes the probe to be enveloped in an ion cloud which in turn constitutes an effective electrical connection with the atmosphere for transferring charge to and from the probe. The output from the electrical field detector is fed to a graph recorder and a control circuit which energizes a pump which, in turn feeds an ion control fluid to the room's air conditioning system to neutralize the electric field in the room.

5 Claims, 2 Drawing Figures

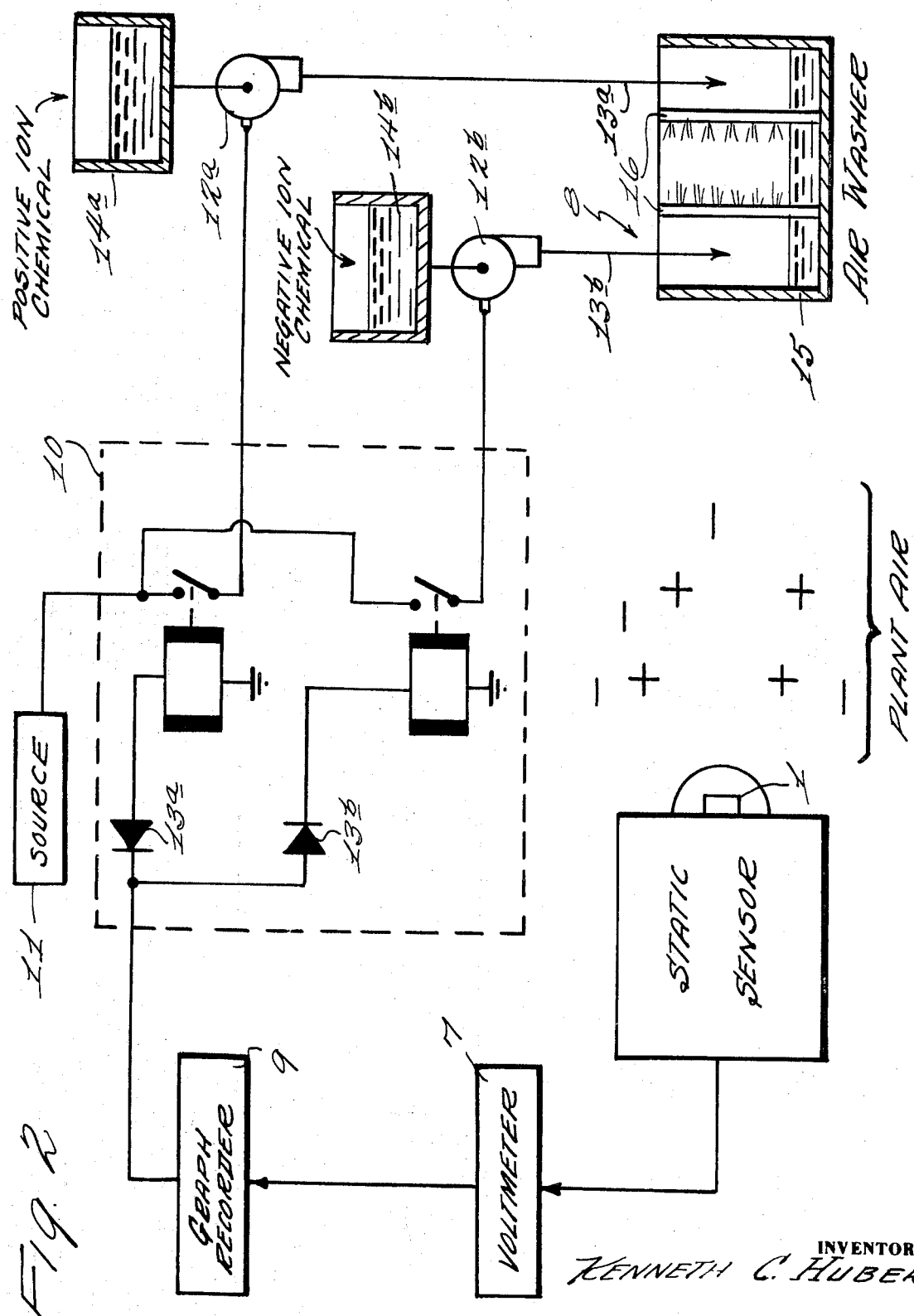

SYSTEM FOR CONTROLLING AN ELECTRIC FIELD

This is a continuation of application Ser. No. 123,229 filed Mar. 11, 1971, now abandoned.

BACKGROUND OF THE INVENTION

This invention relates to the measurement and control of electrostatic electricity in the atmosphere of, for instance, an industrial location such as a production room.

It is known that in various industries the presence of an electrostatic atmospheric field in production rooms causes deleterious effects. For instance, it is believed that such a field upsets spinning and weaving operations by causing the filaments to stand out from the yarn or fabric.

It would therefor be advantageous to control the electric field within industrial locations but, of course, before it can be controlled, the phenomenon must first be measured.

At present, static electricity occurring within an industrial atmosphere is sensed by one of four types of apparatus. One type, the field mill electrometer, is comprised of a rotating metal vane which generates an alternating signal due to the electrostatic field within the atmosphere. To obtain an indication of the electrostatic field using this device it is necessary to synchronously amplify and detect the output of the vane which requires relatively expensive equipment. The second type of sensor is simpler in construction. It requires merely a metal plate or probe exposed to the atmosphere which is an electrical connection, usually through an amplifier, with a voltmeter. Ideally, the probe assumes the potential of the surrounding atmosphere which passes this information through the electrical connection and causes variations in the voltage recorded at the output of voltmeter. In this instrument, however, an electrical charge is induced upon the metallic probe which causes the probe to stop indicating the true variations of the surrounding electrostatic field.

In the third type of apparatus a metallic probe is enveloped by an ion cloud produced by a radioactive source. This ion cloud is then placed into contact with the surface whose potential is to be measured and this potential is read upon a voltmeter.

This type of apparatus, however, suffers from the disadvantage that it is not an electric field measurer but merely a potential measurer. In other words, to measure the effect of atmospheric electrostatic charge in a room the third type of apparatus would require a very large number of measurements to be taken at various locations in the room. Therefore, the use of such a sensing means in an automatic atmospheric electricity control system is virtually impossible.

The fourth type of detector can be described as a space charge measuring instrument. This device counts the ions in a measured volume of air to determine the amount of free charge floating in the atmosphere.

Since this type of detector does not measure the static charge on, for instance, stationary machine parts it does not fully measure the electric field within the industrial environment and thus any control system utilizing such a sensor is not capable of totally neutralizing the charge within the atmosphere. The additional problem with this device is that it is inherently an intermittant operator, i.e., it cannot continuously monitor even the space charge. Thus to use such a device in an automatic neutralizing system requires additional elements.

The following list includes the most pertinent references known to the applicant which show some of the prior art described above:

| | | |
|---|---|---|
| Ecker et al. | 2,927,269 | Issued March 1, 1960 |
| Michner et al. | 3,292,042 | Issued December 13, 1966 |
| Blackwell et al. | 3,449,668 | Issued June 10, 1969 |

SUMMARY OF THE INVENTION

It is the object of this invention to accurately and reliably sense and thereby control the electrostatic field within an industrial environment. This invention comprises a metallic probe having a radioactive element associated therewith. The emissions from the radioactive element cause an ion cloud to surround the metallic probe and thus to electrically connect the probe to the atmosphere. This, in turn, permits a charge electrostatically induced upon the probe to be dissipated to the atmosphere through currents in the ionized cloud thus keeping the probe sensitive to the variations in the electrostatic field, i.e., the applicant's detector is capable of continuous monitoring. The output from the metallic probe is fed through an amplifier to an indicator.

The applicant's detector, unlike certain prior art devices, does not directly connect to a surface to measure the potential of that surface but rather is withdrawn from any surface by a distance at least equal to that of its ion cloud. In this position the applicant's invention measures the total electric field within a given room created by both space charge and static charge; thus only a single sensor is required for the room. Furthermore, since the applicant's device is not in contact with a high potential surface, no large resistance is required between the probe and the amplifier and thus the applicant's device is capable of more sensitive detection than the prior art devices.

Finally, since applicant's detector is capable of continuous, sensitive monitoring of the entire electric field within a room it provides the foundation for a highly efficient system for controlling that electric field. In the preferred embodiment of applicant's invention, the output of the electric field detector controls a pump which feeds an ion control fluid to the air washer of the air conditioning system of the room being monitored to introduce a sufficient quantity of ions into the room's atmosphere of a charge opposite to the measured charge to neutralize the room's atmospheric charge.

BRIEF DESCRIPTION OF THE DRAWINGS

FIG. 2 shows the preferred embodiment of an electric field control system according to this invention.

DETAILED DESCRIPTION OF THE INVENTION

Figure 1:
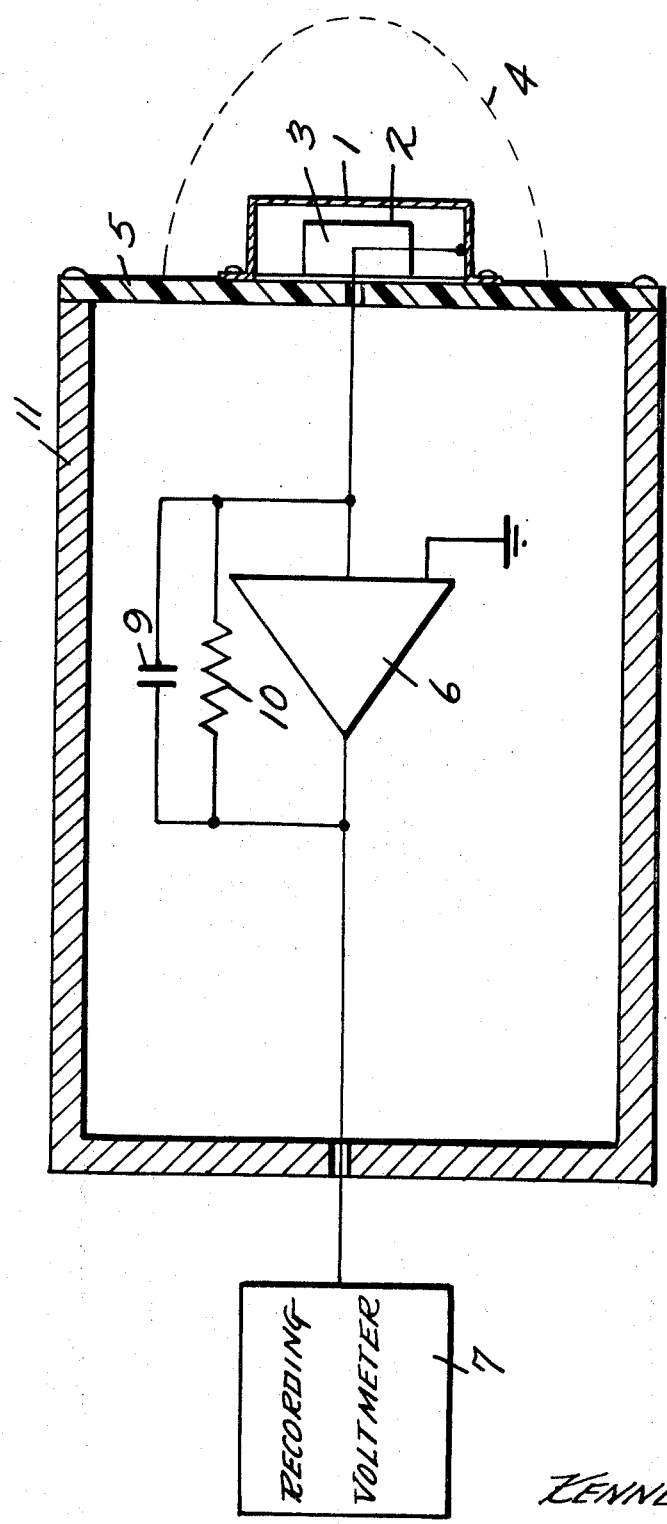
FIG. 1 shows an embodiment of the electric field detector according to this invention.

In FIG. 1 reference numeral 1 indicates an electric field sensor probe which, for example, may have the configuration of an open cage. Numeral 2 indicates a housing disposed within the probe and containing a radioactive element 3. Numeral 4 indicates the ion cloud which is created around the metallic probe due to the emission of particles from the radioactive element.

A suitable radioactive element contains 50 microcuries of Polonium 210 which emits 5.3 Mev alpha particles with a range, in air, of approximately 1.5 inches. Since each alpha particle generates about 160,000 ion pairs, the resulting ions form a dense ion cloud around the element roughly 3 inches in diameter. Other possibilities for the radioactive materials include Americium 241 and Lead 210.

The ions readily permit a current to flow under the influence of the electric field to freely floating charged objects such as charged dust particles or tiny charged particles from textiles as well as from static objects such as machinery which may be present in the room in which the probe is located; the strength of this current will, of course, vary in proportion with the strength of the surrounding field but the probe is capable of detecting very small currents, on the order of $3 \times 10{-10}$ amperes. The ion currents in this ionized cloud permit charges electrostatically induced on the element to be discharged thereby preventing the polarization of charge that hinders many other detectors.

Reference numeral 5 indicates an insulator sheet which is positioned between the probe and the remaining circuitry of the atmospheric electricity detector. It is essential that this insulator, as shown in FIG. 1, extend beyond the boundaries of the ion cloud in order to prevent a shorting between the probe and the remainder of electrical circuitry within the atmospheric electricity detector. In addition, the ion cloud must be kept far enough away from machinery or other metallic objects to prevent contact with the probe since, due to the low input resistance, the sensor is subject to damage by high voltages. While the insulator may be made of any material having the proper electrical and mechanical properties, a commercially available polystyrene plate has been found suitable.

Reference numeral 6 indicates a standard electrometer or operational amplifier which can be electrically connected without an additional resistance to the probe and which amplifies current from the probe and passes the amplified current to the voltmeter 7. The voltmeter, in turn, operates as an indicator of the electric field sensed by probe 1. Capacitor 9 and resistor 10 are the usual feedback elements for an operational amplifier as will be apparent to those skilled in the art. The amplifier and its protective circuitry are housed in housing 11 which may be of a metallic material in which the insulator sheet 5 forms one wall. Alternatively, the insulator sheet 5 can be less extensive than one wall so long as it completely surrounds the ion cloud.

FIG. 2 shows the preferred embodiment of an electric field control system using the electric field detector described above. This system is designed to control the electric field in a room having an air conditioner unit which uses an air spray to control the temperature and humidity. Such air conditioner units are, in themselves, well known and are often used in spinning rooms in the textile industry. In FIG. 2, such an air spray is designated by the numeral 8 and while the rest of the air conditioning unit is not shown it is understood that such a unit circulates all the air in the spinning room past the air spray within a relatively short time interval.

In this environment the detector is located anywhere within the room, but preferably above the reach of the employees and not too close to a strong electric field such as is produced by electric motors. After passing through the detector and voltmeter 7. The current then passes through a cable to the recorder 9, a conventional graph recorder which gives a zero reading in the absence of the electric field.

The recorder then passes the signal to a controller 10 which may be comprised of a pair of electromagnetic relays energized by the output of the detector to connect a source of electricity 11 to one of the pumps 12a and 12b. Because of the rectifiers 13a and 13b the pump 12a is energized when the detector detects a negative electrical field while the pump 12b is energized when the detector detects a positive electrical field.

The pump 12a and the conduit 13a connect the tank 14a to the storage tank 15 of the air washer 8 to deliver fluid from the tank 14a to the tank 15. Similarly, the pump 12b and the conduit 13b connect the tank 14b to the air spray storage tank 15 to deliver fluid from the tank 14b to the tank 15. From the tank 15, the fluid is drawn into the spray nozzle system 16 of the air washer 8 and thereby introduced into the room's air.

Tank 14a contains a fluid which produces a positive ion when aerated, for example, a Quaternary Amine, while tank 14b contains a fluid which produces negative ions when aerated, for example, a common laundry soap. It must be noted that while the ion producing properties of the above fluids have been known to the prior art and these fluids have, in fact, been used to neutralize atmospheres it has not been possible to use these fluids in a system for automatically controlling static electricity in a closed room since the appropriate amount of chemical to neutralize the charge could not be determined by the prior art.

By effectively monitoring the electric field the applicant's detector allows the introduction of the proper amount of the ion producing fluids to neutralize the atmosphere without over compensation. Thus, when a negative field in the room's atmosphere is detected by the probe 1, the controller 10 energizes the pump 12a to introduce a very small and controlled amount of Quaternary Amine into the air spray storage tank 15. Likewise, when a positive field in the room's atmosphere is detected by the probe the controller energizes the pump 12b to introduce a very small and controlled amount of laundry soap in the air spray storage tank 15.

The applicant's tests have shown that his control system is not only effective but rapid, i.e., that a complete neutralization of the atmosphere usually occurs usually within twenty minutes after an electric field is detected.

While the above paragraphs provide a full description of the preferred embodiment many modifications are possible within the scope of applicant's invention. For instance, since the electric field in a spinning room is usually negative, the control system may be operated without the pump 12b, conduit 12b' and tank 14b. Also, many alternative control systems may be coupled with the detector.

For example, a grid can be placed in the air conditioning duct to emit ions to neutralize the electric field within a room upon response to a control system.

In addition, the detector may be used in a system to neutralize the electric field within a local area. In these cases local neutralizing means can be a corona discharge needle or a radioactive ion producing source.

Another local neutralizing means is a ring connected to the detector output and having a voltage imposed thereon which is proportional to and has the same sign as the output from the detector. A grounded spray nozzle is then placed to the ring so that a charge is imposed upon the droplets sprayed through the ring having an opposite sign to the ring charge whence the droplets neutralize the local area.

What is claimed is:

1. A system for controlling an electric field comprising:

an ungrounded metallic electrode exposed to the atmosphere, a radioactive source associated with said metallic electrode for creating outside said electrode an ion cloud unconstrained in the atmosphere surrounding said metallic electrode to place said electrode in contact with said atmosphere, a current indicator means electrically connected to said electrode, an insulator mounted between said electrode and said indicator means and extending past the boundary of said ion cloud, an amplifier disposed between said insulator and said indicator and electrically connected directly to said probe and said indicator, and means for introducing into said atmosphere ions of such polarity as to neutralize said electric field and control means connected to said indicator means for energizing said neutralizing means when said indicator means produces an output as a function of said output.

2. The device as claimed in claim 1 wherein the atmosphere being detected is within a room having an air conditioner through which at least a portion of said room's air is circulated and wherein said means for neutralizing said electric field includes a means for introducing at least one ion producing fluid into said air conditioning system.

3. A device as claimed in claim 2 wherein said ion introducing means comprises a pump; a tank containing said ion producing fluid connected through said pump to said air conditioning system and an electric motor for driving said pump which is energized in response to a signal from said indicator means.

4. A device as claimed in claim 2 wherein said ion producing fluid is a Quaternary Amine.

5. A device as claimed in claim 3 wherein there are two ion producing fluids, a first fluid for producing positive ions contained within a first tank and a second fluid for producing negative ions contained within a second tank and said introducing means comprises two pumps, two electric motors for energizing said pumps, each of said tanks being connected through a separate one of said two pumps to said air conditioning system, and a control means for energizing one of said motors in response to a negative signal from said indicator means and for energizing the other of said motors in response to a positive signal from said indicator means to feed said first and second fluids respectively to said air conditioning system.

* * * * *